US008980430B2

(12) United States Patent
Colombo et al.

(10) Patent No.: US 8,980,430 B2
(45) Date of Patent: Mar. 17, 2015

(54) PCTFE FILM WITH EXTRUSION COATING OF EVA OR EVA WITH UV ABSORBERS

(76) Inventors: Frank J. Colombo, Rochester, NY (US); Yuan-Ping R. Ting, Plainsboro, NJ (US)

( * ) Notice: Subject to any disclaimer, the term of this patent is extended or adjusted under 35 U.S.C. 154(b) by 1558 days.

(21) Appl. No.: 11/510,921

(22) Filed: Aug. 28, 2006

(65) Prior Publication Data

US 2008/0050597 A1   Feb. 28, 2008

(51) Int. Cl.
*B32B 7/12* (2006.01)
*B32B 27/36* (2006.01)
*B32B 27/08* (2006.01)

(52) U.S. Cl.
CPC .................. *B32B 27/36* (2013.01); *B32B 27/08* (2013.01); *Y10S 428/917* (2013.01)
USPC ..................... 428/423.1; 428/355 N; 428/353; 428/411.1; 428/422; 428/76; 428/917; 524/590; 528/44; 528/60; 528/65; 528/66; 528/80; 528/85

(58) Field of Classification Search
None
See application file for complete search history.

(56) References Cited

U.S. PATENT DOCUMENTS

| | | | | |
|---|---|---|---|---|
| 3,645,817 | A | * | 2/1972 | Walker et al. .................. 156/108 |
| 4,400,428 | A | * | 8/1983 | Rosenthal et al. ............. 428/349 |
| 4,677,017 | A | * | 6/1987 | DeAntonis et al. ............ 428/214 |
| 4,946,535 | A | * | 8/1990 | Meckel et al. .............. 156/331.7 |
| 5,427,842 | A | * | 6/1995 | Bland et al. .................... 428/213 |
| 5,583,394 | A | * | 12/1996 | Burbank et al. ............... 313/498 |
| 5,589,028 | A | * | 12/1996 | Robinson et al. .......... 156/306.6 |
| 5,972,176 | A | * | 10/1999 | Kirk et al. ...................... 204/164 |
| 6,287,652 | B2 | | 9/2001 | Speckhals et al. ............ 428/35.2 |
| 6,306,503 | B1 | | 10/2001 | Tsai .............................. 428/412 |
| 6,432,542 | B1 | | 8/2002 | Tsai .............................. 428/421 |
| 6,632,518 | B1 | | 10/2003 | Schmidt et al. ............... 428/335 |
| 6,706,351 | B2 | | 3/2004 | Abusleme et al. ......... 428/36.91 |
| 6,749,940 | B1 | * | 6/2004 | Terasaki et al. ............. 428/425.8 |
| 6,753,087 | B2 | | 6/2004 | Jing et al. ...................... 428/421 |
| 2002/0197478 | A1 | | 12/2002 | Muggli et al. |
| 2003/0230190 | A1 | | 12/2003 | Douglas ........................... 91/454 |
| 2004/0144482 | A1 | | 7/2004 | Cherpinsky et al. ........... 156/247 |
| 2004/0197568 | A1 | | 10/2004 | Jing et al. ...................... 428/421 |
| 2005/0116636 | A1 | | 6/2005 | Kang |
| 2005/0233150 | A1 | | 10/2005 | Jing et al. ...................... 428/421 |
| 2006/0078741 | A1 | | 4/2006 | Ramalingam |

FOREIGN PATENT DOCUMENTS

| | | |
|---|---|---|
| EP | 605558 A1 | 7/1994 |
| EP | 1 033 326 A1 | 9/2000 |
| EP | 1033326 | 9/2000 |
| EP | 1518797 | 3/2005 |
| EP | 1 647 587 A1 | 4/2006 |
| EP | 1647587 | 4/2006 |
| JP | 63-224943 A | 9/1988 |
| JP | 01301572 A2 | 12/1989 |
| JP | 02095848 A2 | 4/1990 |
| JP | 02141224 A | 5/1990 |
| JP | 3000580 B2 | 7/1990 |
| JP | 03030946 A | 2/1991 |
| JP | 03042244 A2 | 2/1991 |
| JP | 04255322 A | 9/1992 |
| JP | 04-316840 A | 11/1992 |
| JP | 04316841 A | 11/1992 |
| JP | 06055709 | 3/1994 |
| JP | 07238262 A2 | 9/1995 |
| JP | 3385292 B2 | 3/1996 |
| JP | 09029890 A2 | 2/1997 |
| JP | 10156918 A | 6/1998 |
| JP | 10323936 A2 | 12/1998 |
| JP | 11061069 | 3/1999 |
| JP | 2000340186 | 12/2000 |
| JP | 2001094135 | 4/2001 |
| JP | 2003-281961 A | 10/2003 |
| JP | 2003281969 | 10/2003 |
| JP | 2005313938 | 11/2005 |
| JP | 2006026941 | 2/2006 |
| WO | WO 2004048081 A1 * | 6/2004 |

OTHER PUBLICATIONS

Ariga Hiroshi, "Method for Adhering Fluororesin", Maching Translation of JP 07-238262, Sep. 12, 1995.*
Hiroshi Ariga, "Fluorine Resin Adhesion Method", English translation of JP 07-238262, Sep. 12, 1995.*
Suzuki Shinji, "Adhesive Tape for Tactile Switch, Adhesive Composition for Tactile Switch, and Tactile Switch", Machine translation of JP 2003-3281961A, Oct. 3, 2003.*
Alex M. Henderson, "Ethylene-Vinyl Acetate (EVA) Copolymers: A General Review", IEEE Electrical Insulation Magazine, vol. 9, No. 1, pp. 30-38, Jan./Feb. 1993.*
Brochure of Takelac Polyurethane Adhesives from Mitsui Chemicals, retrived on Feb. 23, 2014.*
Brochure of Tycel 7900 Adhesive /Tycel 7283 Curing Agent from Liofol, retrived on Feb. 27, 2014.*
Gunter Oertel (ed), "Polyurethane Handbook Chemistry-Raw Materials-Processing Applications-Properties", 1994, Hanser Publishers, 2nd edition, pp. 559 and 595-613.*
Takanori, Kobayashi et al., "Method for Producing Laminate Film", English translation of JP 2004-230749, published on Aug. 19, 2004, pp. 1-28.*

* cited by examiner

*Primary Examiner* — Hai Vo
*Assistant Examiner* — Anish Desai

(57) ABSTRACT

Multilayer fluoropolymer-containing films having improved interlayer adhesion. More particularly, multilayer films including a fluoropolymer layer attached to a thermoplastic polymer layer via an intermediate poly(ester-urethane) copolymer containing adhesive layer, articles produced therefrom, and products which are encased by the multilayer films. The films are suitable for encasing the sensitive luminescent components of electroluminescent lamps.

18 Claims, 1 Drawing Sheet

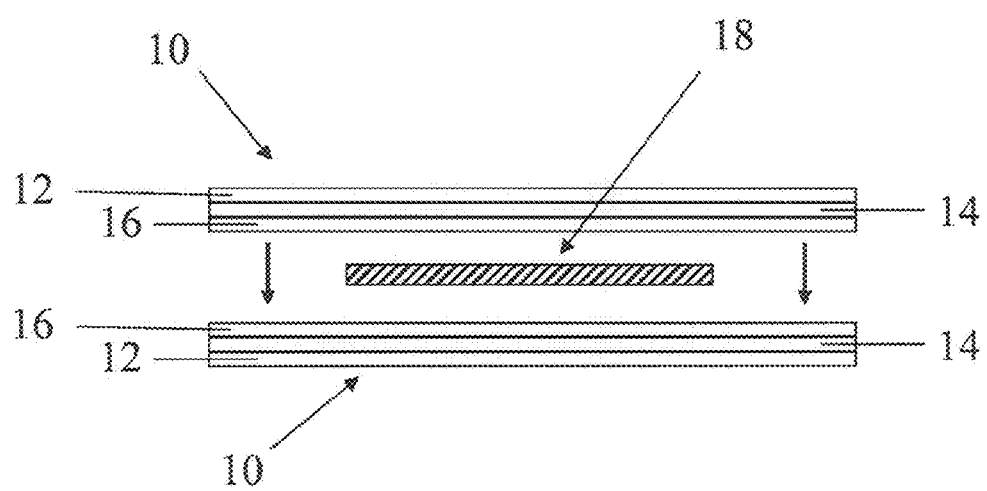

PCTFE FILM WITH EXTRUSION COATING OF EVA OR EVA WITH UV ABSORBERS

BACKGROUND OF THE INVENTION

1. Field of the Invention

The invention relates to multilayer fluoropolymer-containing films having improved interlayer adhesion. More particularly, the invention pertains to multilayer films including a fluoropolymer layer attached to a thermoplastic polymer layer via an intermediate poly(ester-urethane) copolymer containing adhesive layer, articles produced therefrom, and products which are encased by the multilayer films.

2. Description of the Related Art

A wide variety of thermoplastic polymers and films formed from such thermoplastic polymers are known. Important physical characteristics of such films include its barrier properties, including barriers to gas, aroma, and/or vapor such as water vapor, as well as its physical characteristics, such as toughness, wear and weathering resistances, and light-transmittance.

It is well known in the art to produce multilayer fluoropolymer-containing films. See, for example, U.S. Pat. Nos. 4,146,521; 4,659,625; 4,677,017; 5,139,878; 5,855,977; 6,096,428; 6,138,830; and 6,197,393. Many fluoropolymer materials are commonly known for their excellent moisture and vapor barrier properties, and therefore are desirable components of packaging films, particularly lidding films and blister packages. In addition, fluoropolymers exhibit high thermal stability and excellent toughness. However, such use of fluoropolymers is restricted to specialty packaging applications due to their relatively high cost. A suitable means of reducing the cost of a packaging material fabricated from a costly polymer is to form multilayer structures in which the polymer film is laminated with other, less costly polymer films. This approach is particularly desirable for the fluoropolymer packaging applications since a thin layer of the fluoropolymer is often all that is needed to take advantage of the desirable properties of the fluoropolymer while minimizing the cost. However, fluoropolymers do not adhere strongly to most other polymers. In fact, most fluoropolymers are known for their non-stick characteristics. This is very disadvantageous, because poor bond strength between layers can result in the delamination of multilayer films.

To improve the bond strength between a layer of a fluoropolymer and a layer of a thermoplastic polymer (e.g. a non-fluoropolymer layer), an adhesive layer may be used between adjacent layers. For example, U.S. Pat. No. 4,677,017 discloses coextruded multilayer films which include at least one fluoropolymer film and at least one thermoplastic film which are joined by the use of an adhesive polymer, particularly ethylene/vinyl acetate polymers, as an adhesive layer. U.S. Pat. No. 4,659,625 discloses a fluoropolymer multilayer film structure which utilizes a vinyl acetate polymer adhesive layer. U.S. Pat. No. 5,139,878, discloses a fluoropolymer film structure using an adhesive layer of modified polyolefins. U.S. Pat. No. 6,451,925 teaches a laminate of a fluoropolymer layer and a non-fluoropolymer layer using an adhesive layer which is a blend of an aliphatic polyamide and a fluorine-containing graft polymer. Additionally, U.S. Pat. No. 5,855,977 teaches applying an aliphatic di- or polyamine to one or more surfaces of a fluoropolymer or non-fluoropolymer material layer.

In addition to traditional fluoropolymer packaging applications, fluoropolymer-containing films are presently employed as barrier films in the electroluminescent lamp (EL) industry, where the films are used to encapsulate sensitive luminescent materials. Electroluminescence is a means of generating light by the electrical excitation of light emitting phosphors. In a typical electroluminescent lamp, light emitting phosphors are located between two electrically conductive electrodes, wherein one is opaque and the other is transparent to allow light to escape. When an alternating current is applied to the plates, the phosphors are excited and produce light. As an integral part of an electroluminescent lamp assembly, multilayer barrier films are commonly used to encase or encapsulate the functioning electrode-phosphor structure, providing improved structural properties and allowing the lamps to be used under extreme environmental and temperature conditions. Due to their excellent moisture and vapor barrier properties, and their high thermal stability and excellent toughness properties, fluoropolymer-containing films are particularly effective encapsulating materials.

There is a continuing need in the art for further improvements in fluoropolymer-containing multilayer films and film structures. For example, it is well known to produce electroluminescent devices by coating a polyethylene terephthalate (PET) substrate with conductive materials, followed by encapsulation with a barrier film. As technology developed, the advantages of fluoropolymer films were recognized and barrier films including polychlorotrifluoroethylene (PCTFE) were introduced. These early barrier films for EL applications used a PCTFE film with an extrusion coating of an ethylene acrylic acid (EAA) copolymer. However, EAA films have a less than desired bond strength when thermal bonded to internal PET layers of electroluminescent lamps. Further, EAA has a high sealing temperature of about (300° F.) 148.9° C., which requires additional time and energy for processing.

Accordingly, there is a particular need in the art of electrolunminescent lamps for improved encapsulation materials.

The present invention provides a solution to this need in the art. The invention provides multilayer films comprising a fluoropolymer layer and a thermoplastic polymer layer which are attached by an intermediate adhesive layer comprising a poly(ester-urethane) copolymer. It has been found that a poly(ester-urethane) copolymer has exceptional adhesion to both fluoropolymer layers and non-fluoropolymer layers. In the preferred embodiment of the invention, the thermoplastic polymer layer comprises an ethylene vinyl acetate (EVA) copolymer. Ethylene vinyl acetate provides significant benefits over EAA. First, EVA seals at about 250° F. (121° C.), allowing for increased productivity. Second, EVA forms a significantly better thermal bond with PET than EAA. Third, EVA is crystal clear at room temperature, allowing it to be used for traditional packaging applications. Also, with the addition of optional ultraviolet light absorbers, EVA protected EL products are acceptable for outdoor applications. The multilayer films are also highly effective for use as protective packaging films, such as archival bags.

SUMMARY OF THE INVENTION

The invention provides a multilayer film comprising:
a) a fluoropolymer layer having a first surface, and a second surface opposed to the first surface;
b) an adhesive layer in contact with the first surface of the fluoropolymer layer, said adhesive layer comprising a poly(ester-urethane) copolymer; and
c) a thermoplastic polymer layer having a first surface, and a second surface opposed to the first surface, the thermoplastic polymer layer being attached to the fluoropolymer layer such that the adhesive layer is positioned in contact with the first surface of the fluoropolymer layer and the first surface of the thermoplastic polymer layer.

The invention also provides a process for producing a multilayer film comprising the steps of:

a) providing a fluoropolymer layer having a first surface, and a second surface opposed to the first surface;
b) corona treating the first surface of the fluoropolymer layer;
c) applying an adhesive layer onto the corona treated first surface of the fluoropolymer layer, said adhesive layer comprising a poly(ester-urethane) copolymer; and
d) attaching a thermoplastic polymer layer, having a first surface, and a second surface opposed to the first surface, to the fluoropolymer layer, such that the adhesive layer is positioned in contact with the first surface of the fluoropolymer layer and the first surface of the thermoplastic polymer layer.

The invention further provides an encased product comprising a product which is surrounded and encased by at least one multilayer film, the multilayer film comprising:

a) a fluoropolymer layer having a first surface, and a second surface opposed to the first surface;
b) an adhesive layer in contact with the first surface of the fluoropolymer layer, said adhesive layer comprising a poly(ester-urethane) copolymer; and
c) a thermoplastic polymer layer having a first surface, and a second surface opposed to the first surface, the thermoplastic polymer layer being attached to the fluoropolymer layer such that the adhesive layer is positioned in contact with the first surface of the fluoropolymer layer and the first surface of the thermoplastic polymer layer.

BRIEF DESCRIPTION OF THE DRAWINGS

FIG. 1 is a schematic representation of a multilayer film of the invention encasing a product.

DETAILED DESCRIPTION OF THE PREFERRED EMBODIMENTS

Referring to FIG. 1, the invention provides a multilayer film 10 including a fluoropolymer layer 12 attached to a thermoplastic polymer layer 16. These layers are attached by an intermediate adhesive layer 14, also referred to as a primer layer. Adhesive layer 14 imparts excellent bond strength between adjacent layers of the film, and particularly between the fluoropolymer layer 12 and thermoplastic polymer layer 16.

The fluoropolymer layer 12 has first and second opposed surfaces and the adhesive layer 14 is applied onto the first surface. Fluoropolymer materials are commonly known for their excellent chemical resistance and release properties as well as moisture and vapor barrier properties, and therefore are desirable components of packaging films. In the preferred embodiment of the invention, the fluoropolymer layer 12 may be comprised of fluoropolymer homopolymers or copolymers or blends thereof as are well known in the art and are described in, for example, U.S. Pat. Nos. 4,510,301, 4,544,721 and 5,139,878. Preferred fluoropolymers include, but are not limited to, homopolymers and copolymers of chlorotrifluoroethylene, ethylene-chlorotrifluoroethylene copolymer, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof. As used herein, copolymers include polymers having two or more monomer components. The most preferred fluoropolymers include homopolymers and copolymers of poly(chlorotrifluoroethylene). Particularly preferred are PCTFE (polychlorotrifluoroethylene homopolymer) materials sold under the ACLON™ trademark, and ACLAR® PCTFE films formed therefrom, which are commercially available from Honeywell International Inc. of Morristown, N.J.

In the production of the multilayer film 10 of the invention, the fluoropolymer layer 12 is attached to thermoplastic polymer layer 16. The thermoplastic polymer layer 16 has first and second opposed surfaces and is attached to the fluoropolymer layer 12 such that the adhesive layer is positioned in contact with the first surface of the fluoropolymer layer and the first surface of the thermoplastic polymer layer. Suitable thermoplastic polymer materials include polyolefin homopolymers, polyolefin copolymers, cyclic olefin homopolymers, cyclic olefin copolymers, ethylene vinyl acetate copolymers, polyesters such as polyethylene terephthalate, polyamides, polyvinyl chloride, polyvinylidene chloride, polystyrene, styrenic copolymers, polyisoprene, polyurethanes, ethylene ethyl acrylate, ethylene acrylic acid copolymers, and combinations thereof. The thermoplastic polymer layer 16 may also comprise another fluoropolymer layer.

Suitable polyolefins for use as the thermoplastic polymer layer 16 include polymers of alpha-olefin monomers having from about 3 to about 20 carbon atoms and include homopolymers, copolymers (including graft copolymers), and terpolymers of alpha-olefins. Illustrative homopolymer examples include low density polyethylene (LDPE), ultra low density polyethylene (ULDPE), linear low density polyethylene (LLDPE), metallocene linear low density polyethylene (m-LLDPE), medium density polyethylene (MDPE), and high density polyethylene (HDPE), polypropylene, polybutylene, polybutene-1, poly-3-methylbutene-1, poly-pentene-1, poly-4,4 dimethylpentene-1, poly-3-methyl pentene-1, polyisobutylene, poly-4-methylhexene-1, poly-5-ethylhexene-1, poly-6-methylheptene-1, polyhexene-1, polyoctene-1, polynonene-1, polydecene-1, polydodecene-1 and the like.

Illustrative polyolefin copolymers and terpolymers for use as the thermoplastic polymer layer 16 include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. Preferred polyolefins are those prepared from alpha-olefins, most preferably ethylene polymers, copolymers, and terpolymers. The above polyolefins may be obtained by any known process. The polyolefin may have a weight average molecular weight of about 1,000 to about 1,000,000, and preferably about 10,000 to about 500,000 as measured by high performance liquid chromatography (HPLC). Preferred polyolefins are polyethylene, polypropylene, polybutylene and copolymers, and blends thereof. The most preferred polyolefin is polyethylene. The most preferred polyethylenes are low density polyethylenes.

Suitable polyamides for use as the thermoplastic polymer layer 16 non-exclusively include homopolymers or copolymers selected from aliphatic polyamides and aliphatic/aromatic polyamides having a weight average molecular weight of from about 10,000 to about 100,000. General procedures useful for the preparation of polyamides are well known to the art. Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here. Of these polyamides, preferred polyamides include nylon 6, nylon 6,6, nylon 6/6,6 as well as mixtures of the same. Of these, nylon 6 is most preferred.

Aliphatic polyamides for use as the thermoplastic polymer layer 16 may be obtained from commercial sources or prepared in accordance with known preparatory techniques. For example, poly(caprolactam) can be obtained from Honeywell International Inc., Morristown, N.J. Exemplary of aliphatic/aromatic polyamides include poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly(2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

In the preferred embodiment of the invention, the thermoplastic polymer layer 16 comprises an ethylene vinyl acetate copolymer. For the purposes of the invention, preferred ethylene vinyl acetate copolymers have a vinyl acetate content of from about 4 mol % to about 80 mol %, more preferably from about 10 mol % to about 60 mol %, and more preferably from about 25 mol % to about 45 mol %. An EVA copolymer having 40 mol % vinyl acetate is most preferred. It has been found that an ethylene vinyl acetate (EVA) copolymer layer having the above vinyl acetate content has excellent properties for packaging films, including heat sealability and a low sealing temperature. Ethylene vinyl acetate copolymers are also clear at room temperature, making them highly desirable for traditional packaging applications, and have been found to have excellent adhesion to polyester films used in the formation of electroluminescent lamps.

As described herein, the adhesive layer 14 of the invention comprises a poly(ester-urethane) copolymer. For the purposes of the invention, a poly(ester-urethane) copolymer is preferably produced by polymerizing a hydroxyl-terminated ester-urethane pre-polymer by linking with a polyfunctional isocyanate (i.e. toluene diisocyanate (TDI) crosslinking agent). The pre-polymer is a polyester polyol, a low molecule weight aliphatic or aromatic polymer with two —OH end groups. Isocyanates are characterized by —NCO groups which are highly reactive with alcohols. Diisocyanates (OCN—R—NCO) have two —NCO groups. The polyester polyol reacts with isocyanate at a polyol to TDI ratio of about 10 to 1, forming the poly(ester urethane). The amount of the diisocyanate determines the linearity of the PEU. TDI reacts slowly with the polyol under ambient conditions, and the reaction takes about 3 to 5 days to complete. Such methods are well known in the art.

The general reaction for preparing an ester urethane is by step polymerization as follows:

Step 1: HO—R$_1$—OH+OCN—R$_2$—NCO+HO—R$_1$—OOCNH—R$_2$—NCO

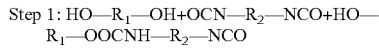

Step 2A: HO—R$_1$—OOCNH—R$_2$—NCO+HO—R$_1$—OH→HO—R$_1$—OOCNH—R$_2$—NHCOO—R$_1$—OH

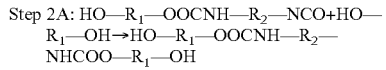

Step 2B: HO—R$_1$—OOCNH—R$_2$—NCO+OCN—R$_2$—NCO→OCN—R$_2$—NHCOO—R$_1$—OOCNH—R$_2$—NCO.

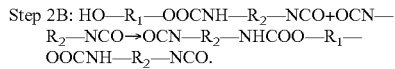

At any given time, the —NCO group will try to find an —OH group to form an NHCOO urethane linkage. The R$_1$ or R$_2$ groups are either aromatic or aliphatic carbon chains. The molecular weight of the pre-polymer determines the length between urethane links. The reaction of the NCO groups of the diisocyanate with the pre-polymer forms the final poly (ester-urethane). The urethane reaction is between the two OH groups (called diol in the pre-polymer) with the two NCO groups (Isocyanate from TDI) to form the urethane linkage (NHCOO). The —COOH carbonyl group has a similar reaction with an NCO group at high temperatures. Both OH and COOH react with NCO to form urethane linkages.

Suitable poly(ester-urethane) polymers are commercially available from Mitsui Takeda Chemicals, Inc under the trademark TAKELAC®; from the Liofol Company, which is a division of Henkel Technologies of Düsseldorf, Germany, under the trademark TYCEL®; Rohm and Haas Chemicals L.L.C., LTD. of Delaware, under the trademark ADCOTE®; and from Upaco Adhesives Inc. of Massachusetts under the mark UNOVERS™.

It has also been advantageously found that a poly(ester-urethane) copolymer is able to chemically react with the thermoplastic polymer layer, including thermoplastic polymer layers comprising EVA, polyester, polyamides, polyvinyl alcohol and polyvinyl acetate, forming strong bonds and resulting in delamination resistant films having high interlayer bond strengths. Particularly, the TDI has functional groups that react with functional groups from other polymers, including hydroxyl, amine (primary and secondary), and carbonyl groups. When a diisocyanate is used in excess, side reactions cause branching and crosslinking. Excess —NCO groups from the TDI reacts with themselves, and also react with —OH and —COOH functional groups available from the thermoplastic polymer layer.

When the thermoplastic polymer layer 16 comprises an EVA polymer, the adhesive anchors to the EVA polymer, achieving high interlayer bond strengths, while retaining its heat and chemical resistance properties. Particularly, the multilayer film of the invention achieves a bond strength between an ethylene vinyl acetate copolymer layer and the fluoropolymer layer of greater than about 300 g/inch (g/2.54 cm), more preferably greater than about 400 g/inch. Regardless of the composition of the thermoplastic polymer layer 16, the multilayer films of the invention preferably have an interlayer bond strength between layer 12 and layer 16 of from about 200 g/inch to about 900 g/inch, more preferably from about 250 g/inch to about 680 g/inch and most preferably from about 270 g/inch to about 570 g/inch.

The multilayer films 10 described herein may further comprise at least one additional polymer layer (not shown) that may be attached on either the outer surface of the fluoropolymer layer 12 or the outer surface of the thermoplastic polymer layer 16, or both. Said at least one additional polymer layer may comprise a layer of any material described herein, but is by no means limited to such materials. For example, said optional additional layers may comprise a layer of a fluoropolymer, a polyamide, a polyolefin such as a polyethylene, an ethylene vinyl acetate copolymer, a polyester such as polyethylene terephthalate, polyvinyl chloride, polyvinylidene chloride, a polyurethane, polystyrene, a styrenic copolymer, an ethylene acrylic acid copolymer, a cyclic olefin homopolymer or copolymer and combinations thereof. The multilayer film may optionally include a plurality of additional layers. Each optional additional layer is preferably attached to the multilayer film via another poly(ester-urethane) copolymer adhesive layer 14 described herein, or via an adhesive layer of any other composition which is capable of adhering to a fluoropolymer layer. Such suitable adhesive materials non-exclusively include those described in U.S. Pat. No. 6,887,334, the disclosure of which is incorporated herein by reference, and also blends comprising a tackifier, ethylene-α-olefin copolymer and optionally a styrenic block copolymer.

Each of the fluoropolymer layer 12, adhesive layer 14, thermoplastic polymer layer 16 and any optional layers may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxygen scavengers, dyes, pigments and other coloring agents, ultraviolet light absorbers and stabilizers, anti-microbial agents, organic or inorganic fillers including particulate and fibrous fillers, reinforcing agents, nucleators, plasticizers, as well as other conventional additives known to the art. Such may be used in amounts, for example, of up to about 30% by weight of the overall layer composition. Representative ultraviolet light stabilizers include various substituted resorcinols, salicylates, benzotriazoles, benzophenones, and the like. Representative anti-microbial agents include silver ion based anti microbial agents, triclosan (5-chloro-2-(2,4-dichlorophenoxy) phenol), thiabendazole, OPBA (10,10'-oxybisphenoxarsine) based anti-microbial agents, isothiazolinone and zinc pyrithione, as well as any antimicrobial agent that can be absorbed by pigment, pigment extenders or inorganic materials, such as zeolites or molecular sieves. These anti-microbial agents are generally not approved for use in food and drug applications and should only be used for industrial applications. Suitable lubricants and release agents include wax, stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also acceptable are hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylenesulfonamide, and combinations of any of the above, as well as other plasticizers known to the art. The films may further have printed indicia on or between layers. Such printing is typically on an internal surface of the structure and methods of application are well known in the art.

The addition of one or more of the above optional additives may advantageously broaden the utility of the multilayer films of the invention. For example, the blending of one or more anti-microbial additives into one or more of the above layers may produce films that are highly effective for use as protective packaging films for products that are highly sensitive to atmospheric conditions. Such applications include archival bags, cigar bags, photograph storage bags, etc. Additives such as oxidation inhibitors or oxygen scavengers are advantageous in forming bags for storing and packaging of food, as well as bottles for storing beverages.

As described herein, the multilayer films of the invention are particularly useful as barrier films in the electroluminescent lamp (EL) industry, where the films are used to encapsulate sensitive luminescent materials. The addition of one or more ultraviolet light absorbers to one or more of the film layers improves the performance of such electroluminescent lamps outdoors. Alternately, an ultraviolet light absorbing layer may be attached to the second surface of the thermoplastic polymer layer 16. In this embodiment, the ultraviolet light absorbing layer may comprise a polymer such as a polyolefin, including polyethylenes and polypropylene; polyvinyl chloride; polyesters, including polyethylene terephthalate; and cyclic olefin copolymers. Most preferably, if present, an ultraviolet light absorbing layer comprises an ultraviolet light absorbing polyester.

The multilayer films 10 of this invention may be produced by conventional methods useful in producing multilayer films, including coating, coextrusion, lamination, extrusion coating and extrusion lamination techniques. In a typical coextrusion process, the polymeric material for the individual layers are fed into infeed hoppers of a like number of extruders, each extruder handling the material for one or more of the layers. The melted and plasticated streams from the individual extruders are directly fed to a multi-manifold die and then juxtaposed and combined into a layered structure or combined into a layered structure in a combining block and then fed into a single manifold or multi-manifold coextrusion die. The layers emerge from the die as a single multiple layer film of polymeric material. After exiting the die, the film is cast onto a first controlled temperature casting roll, passes around the first roll, and then onto a second controlled temperature roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017. One advantage of coextruded films is the formation of a multilayer film in a one process step by combining molten layers of each of the film layers, as well as any other optional film layers, into a unitary film structure.

Alternately, the individual layers may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the fluoropolymer film, the thermoplastic polymer film, the adhesive and any additional layers are positioned on one another, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute.

However, in the absence of thickening additives, the poly (ester-urethane) copolymer adhesive layer 14 is generally difficult to extrude and typically should be applied by conventional coating techniques or other non-extrusion deposition methods. In one preferred technique, adhesive layer 14 is extrusion coated onto fluoropolymer layer 12. Extrusion coating is a process where a molten polymer is applied onto a solid support and passes on a cooling cylinder at the contact of which the polymer adheres to the support. Further, in order to improve adhesion between the fluoropolymer layer 12 and the adhesive layer 14, fluoropolymer layer 12 is preferably subjected to an optional corona treatment. A corona treatment is a process in by which a layer of material is passed through a corona discharge station giving the surface of the layer a charge that improves its ability to bond to an adjacent layer. If conducted, it is preferably done in-line prior to attachment of the adhesive layer 14 and is conducted on the fluoropolymer layer surface to which the adhesive layer 14 will be attached. Preferably, the fluoropolymer film is subjected to about 0.5 to about 3 kVA-min/m$^2$ of corona treatment. More preferably, the corona treatment level is about 1.7 kVA-min/m$^2$.

Suitable corona treatment units are available from Enercon Industries Corp., Menomonee Falls, Wis. and from Sherman Treaters Ltd, Thame, Oxon, UK.

Any of the layers of the multilayer films 10 of the invention may be uniaxially or biaxially oriented individually prior to combining the layers. Alternately, the combination of the fluoropolymer layer 12, adhesive layer 14, thermoplastic polymer layer 16 and any additional layers, may be uniaxially or biaxially oriented together. For the purposes of the present invention the term draw ratio is an indication of the increase in the dimension in the direction of draw. The layers may be drawn to a draw ratio of from 1.5:1 to 5:1 uniaxially in at least one direction, i.e. its longitudinal direction, its transverse direction or biaxially in each of its longitudinal and transverse directions. For example, the component films or the multilayer film may be uniaxially oriented from about 1.3 to about 10 times in either its longitudinal or transverse directions, or the component films or the multilayer film may be biaxially oriented from about 1.5 to about 5 times each of its longitudinal and transverse directions. The film may also be drawn to a lesser or greater degree in either or both of the longitudinal and transverse directions. The layers may be simultaneously biaxially oriented, for example orienting a film in both the machine and transverse directions at the same. This results in dramatic improvements in clarity, strength and toughness properties, as well as an improved moisture vapor transmission rate.

Although each layer of the multilayer film structure may have a different thickness, the fluoropolymer layer 12 has a preferred thickness of from about 15 μm to about 150 μm, more preferably from about 22.5 μm to about 100 μm, and most preferably from about 50 μm to about 100 μm. The thermoplastic polymer layer 16 has a preferred thickness of about 12 μm to about 100 μm, a more preferred thickness of from about 25 μm to about 75 μm, and most preferably from about 25 μm to about 50 μm. The adhesive layers have a preferred thickness of from about 0.13 μm to about 5.05 μm, more preferably from about 0.25 μm to about 2.5 μm and most preferably from about 0.60 μm to about 1.25 μm. Additional layers preferably have a thickness of from about 2.5 μm to about 100 μm, more preferably from about 7.5 μm to about 75 μm and most preferably from about 12.5 μm to about 25 μm. While such thicknesses are referenced, it is to be understood that other layer thicknesses may be produced to satisfy a particular need and yet fall within the scope of the present invention.

The multilayer films of this invention are useful as flat structures or can be formed, such as by thermoforming, into desired shapes. The films are useful for a variety of end applications, such as for medical packaging, pharmaceutical packaging, packaging of other moisture sensitive products and other industrial uses. The multilayer films of the invention are useful for forming thermoformed three dimensionally shaped articles such as tubes, bottles, and as blister packaging for pharmaceuticals or any other barrier packaging applications. This may be done by forming the film around a suitable mold and heating in a method well known in the art.

As illustrated in FIG. 1, packages and encased articles of the invention are preferably formed such that the thermoplastic polymer layer 16 comprises the innermost film layer or layers positioned to contact a product 18. For example, a product 18 may be encased or encapsulated between two multilayer films 10 of the invention, wherein the thermoplastic polymer layer 16 of a first film 10 is attached to the thermoplastic polymer layer of a second film 10. While the FIGURE illustrates two separate films 10 being used to encase product 18, it should be understood that a single film 10 may be suitably used to form a package structure by simply cutting the multilayer film to a desired size and folding the film onto itself to form an overlap having an open top edge and open side edges, followed by sealing the top and side edges of the overlap, typically with heat and pressure, to form a package. Such techniques are conventionally understood by those skilled in the art. Optionally, a locking polymeric zipper may be incorporated into the package, allowing the package to be opened and sealed easily.

The overlapping layers or surface portions may be sealed together using any conventional means in the art. One preferred method of attachment is the use of an adhesive. Suitable adhesives for bag formation non-exclusively include any of the adhesive materials described herein, as well as polyurethanes, pressure sensitive adhesives (PSAs), epoxies and the like. However, in the most preferred embodiment of the invention, thermoplastic polymer layer 14 comprises a material that is heat sealable, particularly heat sealable to itself under conventional heat sealing conditions without requiring an adhesive.

The heat sealing process forms a strong interlayer bond between film surfaces. Heat sealing techniques are well known in the art, and involve the application heat to melt and fuse portions of the polymer layer together. Heat sealing temperatures will vary depending on the properties of the particular thermoplastic polymer layer 16. However, not all polymeric films are heat sealable. In general, heat seal temperatures preferably range from about 150° C. to about 400° C., more preferably from about 250° C. to about 350° C., and heat seal pressures range from about 10 psia to about 100 psia, more preferably from about 40 psi to about 100 psi. The multilayer films are particularly useful for encasing atmospheric sensitive materials, such as luminescent materials that are used in the electroluminescent lamp (EL) industry. Electroluminescent lamps are described, for example, in U.S. Pat. Nos. 5,491,377 and 5,976,613, which are incorporated herein by reference. In the most preferred EL application, thermoplastic polymer layer 16 comprises an ethylene vinyl acetate copolymer, which is a heat sealable material having a heat seal temperature of an ethylene vinyl acetate copolymer layer is about 250° F. (121° C.).

Multilayer barrier articles may be also formed from the films of the invention by conventional injection or co-injection blow molding or stretch-blow molding and coextrusion blow molding techniques, and the like. The typical coinjection stretch-blow molding process consists of an injection molding process which softens the thermoplastic polymer in a heated cylinder, injects it while molten under high pressure into a closed pre-form mold, cooling the mold to induce solidification of the polymer, and ejecting the molded pre-form from the mold. The injection molded pre-form is then heated to a suitable orientation temperature, often in about the 90° C. to 120° C. range, and is then stretch-blow molded. The latter process consists of first stretching the hot pre-form in the axial direction by mechanical means such as by pushing with a core rod insert followed by blowing high pressure air (up to about 500 psi) to stretch in the hoop direction. In this manner, a biaxially oriented blown article is made. Typical blow-up ratios often range from about 5:1 to about 15:1.

The moisture vapor transmission rate (MVTR) of such films of the invention may be determined via the procedure set forth in ASTM F1249. In the preferred embodiment, the overall multilayer film according to this invention has a MVTR of from about 1.0 or less g/100 in$^2$/day (15.5 g/m$^2$/day) of the overall film at 37.8° C. and 100% relative humidity (RH), preferably from 0.0005 to about 0.7 g/100 in$^2$/day (0.0077 to about 10.7 g/m$^2$/day) of the overall film, and more preferably from about 0.001 to about 0.06 g/100 in$^2$/day (0.015 to about 0.93 g/m$^2$/day) of the overall film, as determined by water vapor transmission rate measuring equipment available from, for example, Mocon.

The oxygen transmission rate (OTR) of the films of the invention may be determined via the procedure of ASTM D-3985 using an OX-TRAN 2/20 instrument manufactured by Mocon, operated at 25° C., 0% RH. In the preferred embodiment, the overall multilayer film according to this invention has an OTR of from about 50 or less cc/100 in$^2$/day (775 g/m$^2$/day), preferably from about 0.001 to about 20 cc/100 in$^2$/day (0.015 to about 310 g/m$^2$/day), and more preferably from about 0.001 to about 10 cc/100 in$^2$/day (0.015 to about 150 cc/m$^2$/day).

The following non-limiting examples serve to illustrate the invention.

Example 1

A PCTFE homopolymer layer having a base thickness of 2 mil (50 μm) was cast and subsequently extrusion coated with an EVA layer having a base thickness of 2 mil (50 μm). The EVA layer was made from Dow Appeel® resin 1181. To improve adhesion, one surface of the PCTFE layer was corona treated, producing a film with a minimum surface energy of 45 dyne, as tested by either surface energy pens or water contact angle techniques.

The corona treated surface of the PCTFE layer was coated with a 2-part poly(ester-urethane) copolymer with a ratio of 100 parts urethane and 10 parts toluene diisocyanate. This adhesive was applied by means of rotogravure application process through a coater/laminator machine at a coating weight of about 0.3 lb/ream to about 0.7 lb/ream.

The adhesive was dried in a conventional forced air tunnel at 150° F. (66° C.) for two seconds and then directly passed under an EVA melt curtain at 430° F. (221° C.), followed by sufficient nip pressure to adhere the layers together. The subsequent coated PCTFE film was then wound onto a core.

After 5 minutes in an oven set to 160° F. (71° C.), the initial bond strength was 320 g/inch) After 5 days of cure, the bond strength was 822 g/inch. The coated PCTFE film had a MVTR of 0.0078 g/100 in$^2$/day (0.12 g/m$^2$/day).

Example 2

Example #1 was repeated except that a UV absorber was added to the extruder and blended with the EVA resin. The UV absorber consisted of benzotriazole. After 5 days of cure, the bond strength was 680 g/inch.

Example 3

Example #1 was repeated except that the PCTFE layer had a thickness of 4 mil (200 μm). After 5 days of cure, the bond strength was 799 g/inch.

Example 4

Example #3 was repeated except that a UV absorber was added to the extruder and mixed with the EVA resin. The UV absorber was benzotriazole. After 5 days of cure, the bond strength was 787 g/inch.

Example 5

The films of Examples 1, 2, 3 or 4 are cut into two dimensionally equal pieces of film using a die cutting or hand cutting process. The two pieces are used to encapsulate an electroluminescent (EL) lamp. Each pieces of film is of a greater width and length than the individual lamp parts by ½ in each direction. The first piece is laid with the EVA side facing up. The individual layers of the EL lamp are then placed centered onto the EVA surface. The second piece is then placed centered on top of the lamp structure, with the EVA side facing down, in the same orientation as the first film piece. The combined structure is then placed between two driven heated rollers. The rollers are heated to between 250° F. (121.1° C.) and 290° F. (143.3° C.), and apply a pressure of 40 PSI. The film is then fed through the rollers and the combined structure is heated and melted together. Once cooled, the structure is laser cut to the exact dimensions desired for the lamp.

Example 6

The films of Examples 1, 2, 3 or 4 are formed into a pouch of any desired size. They are then evenly overlapped and the left, right and bottom edges of each films are sealed together using heat and pressure, forming left, right and bottom margins. A zipper can be attached to the top margin if desired. The package is filled with a product, the zipper is closed and the top edge is sealed. Small tear notches are optionally cut into the top edge of the film at the inside corners of the left and right margins.

Examples 7-11

Various multilayer films were produced and tested for maximum and average bond strengths. In each film, a PCTFE homopolymer layer having a base thickness of 2 mil (50 μm) was cast and subsequently extrusion coated with an EVA layer having a base thickness of 2 mil (50 μm). The EVA layer was made from Dow Appeel® resin 1181A multilayer film, and the PCTFE film was Aclar® Ultra 2000 from Honeywell International, Inc. To improve adhesion, one surface of the PCTFE layer was corona treated. The corona treated surface of the PCTFE layer was coated with a 2-part poly(ester-urethane) copolymer prepared with various urethane:TDI ratios, which are set forth in Table 1 below. This adhesive was applied by means of rotogravure application process through a coater/laminator machine at a coating weight of 0.5 lb/ream.

The adhesive was dried in a conventional forced air tunnel at 150° F. (66° C.) for two seconds and then directly passed under an EVA melt curtain at 430° F. (221° C.), followed by sufficient nip pressure to adhere the layers together. The subsequent coated PCTFE film was then wound onto a core. All bond strengths were measured in roll form after 7 days cure time, and yielded the following results:

TABLE 1

| Example Number | Urethane to TDI Catalyst Ratio | Maximum Bond (gm/in) | Average Bond (gm/in) |
| --- | --- | --- | --- |
| 7 | 10/1 | 760 | 620 |
| 8 | 20/1 | 609 | 327 |
| 9 | 30/1 | 501 | 227 |
| 10 | 40/1 | 472 | 210 |
| 11 | 50/1 | 410 | 196 |

Example 12

Comparative

Multilayer films similar to the films of Examples 7-11 were produced but with a different adhesive primer layer. The adhesive was the KH-1 primer whose composition is outlined in Table 2. These films had a maximum bond strength of 320 and an average bond strength of 175.

TABLE 2

| KH-1 Primer Components and Formulation | | |
| --- | --- | --- |
| 1 | Epon 828 | 145 grams |
| 2 | Ethyl Acetate | 3,408 grams (1 gallon) |
| 3 | Lupasol P | 290 grams |
| 4 | Isopropanol | 11,150 grams (3.75 gallons) |

Epon ® 828 is a bis-phenyl A diglycidylether epoxy available from Miller-Stephenson Chemical Company of Danbury, CT.
Lupasol ™ P is an ethylenimine homopolymer available from BASF Aktiengesellschaff of Germany.

Examples 7-12 illustrate that an ester urethane adhesive having a high TDI catalyst ratio dramatically improves bond strength in a multilayer, fluoropolymer containing film.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A multilayer film comprising: a) a fluoropolymer layer having a first corona treated surface, and a second surface opposed to the first corona treated surface; wherein the fluoropolymer layer comprises a polychlorotrifluoroethylene; b) an adhesive layer comprising a hydroxyl-terminated poly (ester-urethane) copolymer; wherein the hydroxyl-terminated poly(ester-urethane) copolymer is produced by polymerizing a hydroxyl-terminated ester-urethane pre-polymer with a polyfunctional isocyanate at a prepolymer to polyfunctional isocyanate ratio of 10:1, the adhesive layer being in contact with the first corona treated surface of the fluoropolymer layer; and c) a thermoplastic polymer layer comprising ethylene vinyl acetate copolymer and having a first surface, and a second surface opposed to the first surface, the thermoplastic polymer layer being attached to the fluoropolymer layer such that the adhesive layer is positioned in contact with the first corona treated surface of the fluoropolymer layer and the first surface of the thermoplastic layer; the multilayer film having a bond strength between the fluoropolymer layer and the thermoplastic layer of greater than about 300 g/in (g/2.54 cm).

2. The multilayer film of claim 1 wherein said ethylene vinyl acetate copolymer has a vinyl acetate content of from about 4 mol % to about 80 mol %.

3. The multilayer film of claim 1 wherein said ethylene vinyl acetate copolymer has a vinyl acetate content of from about 10 mol % to about 60 mol %.

4. The multilayer film of claim 1 wherein said thermoplastic polymer layer further comprises an ultraviolet light absorber.

5. The multilayer film of claim 1 further comprising an ultraviolet light absorbing layer attached to the second surface of the thermoplastic polymer layer.

6. An article formed from the multilayer film of claim 1.

7. The multilayer film of claim 1 wherein said ethylene vinyl acetate copolymer has a vinyl acetate content of from about 25 mol % to about 45 mol %.

8. The multilayer film of claim 1, having a water vapor transmission rate of about 0.0005 to about 0.001 g/100 in$^2$/day.

9. The multilayer film of claim 1, having an oxygen transmission rate of about 0.001 to about 20 cc/100 in$^2$/day.

10. The multilayer film of claim 1 wherein the multilayer film has a bond strength between the fluoropolymer layer and the thermoplastic layer of greater than about 400 g/inch (g/2.54 cm).

11. An encased product comprising a product which is surrounded and encased by at least one multilayer film, the multilayer film comprising: a) a fluoropolymer layer having a first corona treated surface, and a second surface opposed to the first corona treated surface; wherein the fluoropolymer layer comprises a polychlorotrifluoroethylene; b) an adhesive layer comprising a hydroxyl-terminated poly(ester-urethane) copolymer; wherein the hydroxyl-terminated poly(ester-urethane) copolymer is produced by polymerizing a hydroxyl-terminated ester-urethane pre-polymer with a polyfunctional isocyanate at a prepolymer to polyfunctional isocyanate ratio of 10:1, the adhesive layer being in contact with the first corona treated surface of the fluoropolymer layer; and c) a thermoplastic polymer layer comprising ethylene vinyl acetate copolymer and having a first surface, and a second surface opposed to the first surface, the thermoplastic polymer layer being attached to the fluoropolymer layer such that the adhesive layer is positioned in contact with the first corona treated surface of the fluoropolymer layer and the first surface of the thermoplastic layer; the multilayer film having a bond strength between the fluoropolymer layer and the thermoplastic layer of greater than about 300 g/in (g/2.54 cm).

12. The encased product of claim 11 wherein said product is surrounded such that the thermoplastic polymer layer of said at least one multilayer film is in contact with said product.

13. The encased product of claim 11 wherein said fluoropolymer layer comprises a polychlorotrifluoroethylene.

14. The encased product of claim 11 wherein said product comprises a luminescent material.

15. The encased product of claim 14 wherein said ethylene vinyl acetate copolymer has a vinyl acetate content of from about 4 mol % to about 80 mol %.

16. The encased product of claim 11 wherein said thermoplastic polymer layer further comprises an ultraviolet light absorber.

17. The encased product of claim 11 further comprising an ultraviolet light absorbing layer attached to the second surface of the thermoplastic polymer layer.

18. An encased electroluminescent lamp product comprising: a luminescent material surrounded and encased by at least one multilayer film, the multilayer film comprising: a) a fluoropolymer layer having a first corona treated surface, and a second surface opposed to the first corona treated surface; wherein the fluoropolymer layer comprises a polychlorotrifluoroethylene; b) an adhesive layer comprising a hydroxyl-terminated poly(ester-urethane) copolymer; wherein the hydroxyl-terminated poly(ester-urethane) copolymer is produced by polymerizing a hydroxyl-terminated ester-urethane pre-polymer with a polyfunctional isocyanate at a prepolymer to polyfunctional isocyanate ratio of 10:1, the adhesive layer being in contact with the first corona treated surface of the fluoropolymer layer; and c) a thermoplastic polymer layer comprising ethylene vinyl acetate copolymer and having a first surface, and a second surface opposed to the first surface, the thermoplastic polymer layer being attached to the fluoropolymer layer such that the adhesive layer is positioned in contact with the first corona treated surface of the fluoropolymer layer and the first surface of the thermoplastic layer; the multilayer film having a bond strength between the fluoropolymer layer and the thermoplastic layer of greater than about 300 g/in (g/2.54 cm).

* * * * *